(12) United States Patent
Linnartz et al.

(10) Patent No.: US 8,488,971 B2
(45) Date of Patent: Jul. 16, 2013

(54) METHOD, SYSTEM AND DEVICE FOR TRANSMITTING LIGHTING DEVICE DATA

(75) Inventors: Johan Paul Marie Gerard Linnartz, Eindhoven (NL); Hendricus Theodorus Gerardus Maria Penning De Vries, Eindhoven (NL); Lorenzo Feri, Eindhoven (NL); Sel Brian Colak, Eindhoven (NL); Paulus Henricus Antonius Damink, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 599 days.

(21) Appl. No.: 12/668,458

(22) PCT Filed: Jul. 11, 2008

(86) PCT No.: PCT/IB2008/052802
§ 371 (c)(1),
(2), (4) Date: Jun. 17, 2010

(87) PCT Pub. No.: WO2009/010909
PCT Pub. Date: Jan. 22, 2009

(65) Prior Publication Data
US 2010/0254712 A1 Oct. 7, 2010

(30) Foreign Application Priority Data
Jul. 19, 2007 (EP) .................................... 07112787

(51) Int. Cl.
*H04B 10/00* (2006.01)

(52) U.S. Cl.
USPC ............................ 398/118; 398/127; 398/128

(58) Field of Classification Search
USPC ......................................... 398/118, 127, 128
See application file for complete search history.

(56) References Cited

U.S. PATENT DOCUMENTS

| | | | |
|---|---|---|---|
| 6,542,270 B2 * | 4/2003 | Perkins et al. | 398/140 |
| 7,389,051 B2 * | 6/2008 | Morioka et al. | 398/127 |
| 2006/0239689 A1 * | 10/2006 | Ashdown | 398/130 |

FOREIGN PATENT DOCUMENTS

| | | |
|---|---|---|
| EP | 1633060 A1 | 3/2006 |
| GB | 2149947 A | 6/1985 |
| WO | 2004057927 A1 | 7/2004 |
| WO | 2006077968 A1 | 7/2006 |
| WO | 2006111927 A1 | 10/2006 |
| WO | 2006111930 A2 | 10/2006 |
| WO | 2006111934 A1 | 10/2006 |
| WO | 2007069149 A1 | 6/2007 |
| WO | 2008065607 A2 | 6/2008 |

* cited by examiner

*Primary Examiner* — Danny Leung
(74) *Attorney, Agent, or Firm* — Mark L. Beloborodov

(57) ABSTRACT

It is presented a method for transmitting lighting device data. The method comprises the steps of obtaining, in a lighting device, a subset of lighting device data, the lighting device data containing information of the lighting device, transmitting, from the lighting device, using light, the subset of lighting device data, and repeating the above steps until all subsets jointly corresponding to the complete lighting device data have been transmitted. A corresponding lighting device and lighting system are also presented.

12 Claims, 5 Drawing Sheets

METHOD, SYSTEM AND DEVICE FOR TRANSMITTING LIGHTING DEVICE DATA

TECHNICAL FIELD

The present invention relates to a method, a lighting device and a lighting system for transmitting lighting device data.

BACKGROUND OF THE INVENTION

Lighting devices used in large lighting systems keep a significant share in the illumination market. In such systems it is desirable to be able to control each individual lighting device, not only in intensity, but also in colour or even beam width. With the increasing number of light sources present in the same space or room, it is a nontrivial task to assign a logical connection between a control system and all lighting devices during installation. User-friendly methods for the control of such large lighting systems is important for its acceptance on the market.

In the document WO 2006/077968, a proposal for an optical communication system is provided. The optical communication system comprises a plurality of transmitting end apparatuses, each transmitting end apparatus modulating information by use of a given modulation scheme and emitting the modulated light signal with a random timing. The optical communication system further comprises a receiving end apparatus for receiving the emitted light from the transmitting end apparatuses.

This optical communication system nevertheless has some drawbacks, and can certainly be improved. Some of these issues will be addressed by the present invention.

SUMMARY OF THE INVENTION

In view of the above, an objective of the invention is to provide an improvement of the above discussed document. In particular, one objective is to provide a solution to the problem of flickering of light when sending modulated light signals containing information.

According to a first aspect of the present invention, there has been provided a method for transmitting lighting device data, the method comprising the steps of obtaining, in the lighting device, a subset of lighting device data, the lighting device data containing information of a lighting device, transmitting, from the lighting device, embedded in illumination light, the subset of lighting device data, and repeating the above steps until all subsets jointly corresponding to the complete lighting device data have been transmitted. The partitioning to subsets of the lighting device data helps to decrease the flickering of the light, especially when the lights are deeply dimmed.

The step of obtaining may involve splitting the lighting device data into subsets of equal size.

The step of obtaining may involve retrieving the subsets of lighting device data from a data source The method may further comprise the step, prior to the step of transmitting, of: combining the lighting device data with pulse width modulated light. Combining pulse width modulated light with the lighting device data also enables, for example, control of the light intensity or the colour of the light.

A time difference between subsequent occurrences of transmitting subsets of the same lighting device data may equal a pre-determined value.

The steps of obtaining, transmitting and repeating may be repeated for subsequent transmissions of the complete lighting device data. These steps help to decrease lost lighting device data due to collision with other lighting devices and further gives a repeated status of a lighting device.

A time difference between transmitting each complete lighting device data may be determined by obtaining a random time. A random timing of complete transmitted lighting device data helps to decrease the risk for collision with other lighting devices, causing interference of the information in the light.

The step of transmitting may involve time multiplexing light and lighting device data.

According to a second aspect of the present invention there has been provided a lighting device configured to transmit lighting device data, the lighting device comprising a data source, a light emitter, wherein the light emitter is configured to obtain a plurality of subsets of lighting device data from the data source, the plurality of subsets jointly corresponding to the complete lighting device data, and the emitter further being configured to transmit, embedded in illumination light, each of the plurality of subsets of lighting device data.

The lighting device may further be configured to transmit each subset of the subsets of lighting device data, upon obtaining each subset from the data source. The subsets jointly corresponding to the complete lighting device data may be stored partitioned in the subsets in the data source so that less processing is needed when transmitting the lighting device data.

The lighting device may comprise a solid state light source. Solid state light sources allow great control of the properties of light, such as intensity, polarization and colour.

The lighting device may be configured to modulate the light using pulse width modulation, intensity modulation or a combination thereof.

According to a third aspect of the invention there has been provided a lighting system comprising at least one lighting device as mentioned above, and further comprising a receiver, wherein the receiver is configured to receive the subsets of lighting device data jointly corresponding to the complete lighting device data, transmitted from at least one of the at least one lighting devices, processing the received subsets of lighting device data to obtain the complete lighting device data to receive information from at least one of the at least one lighting devices.

The system may comprise a plurality of lighting devices, and clocks of each of the plurality of lighting devices may be asynchronous with respect to each other. In other words, clocks of different lighting devices are not required to be synchronized. Asynchronous clocks help lowering the hardware cost in the lighting devices and the receiver.

The lighting system may further comprise a control unit connected to the lighting device, the control unit being configured to receive lighting device data from the receiver, use the lighting device data to locate the lighting device, and control the light emitted from the lighting device.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

Other objectives, features and advantages of the present invention will appear from the following detailed disclosure, from the attached dependent claims as well as from the drawings.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein.

DETAILED DESCRIPTION OF EMBODIMENTS

Figure 1:
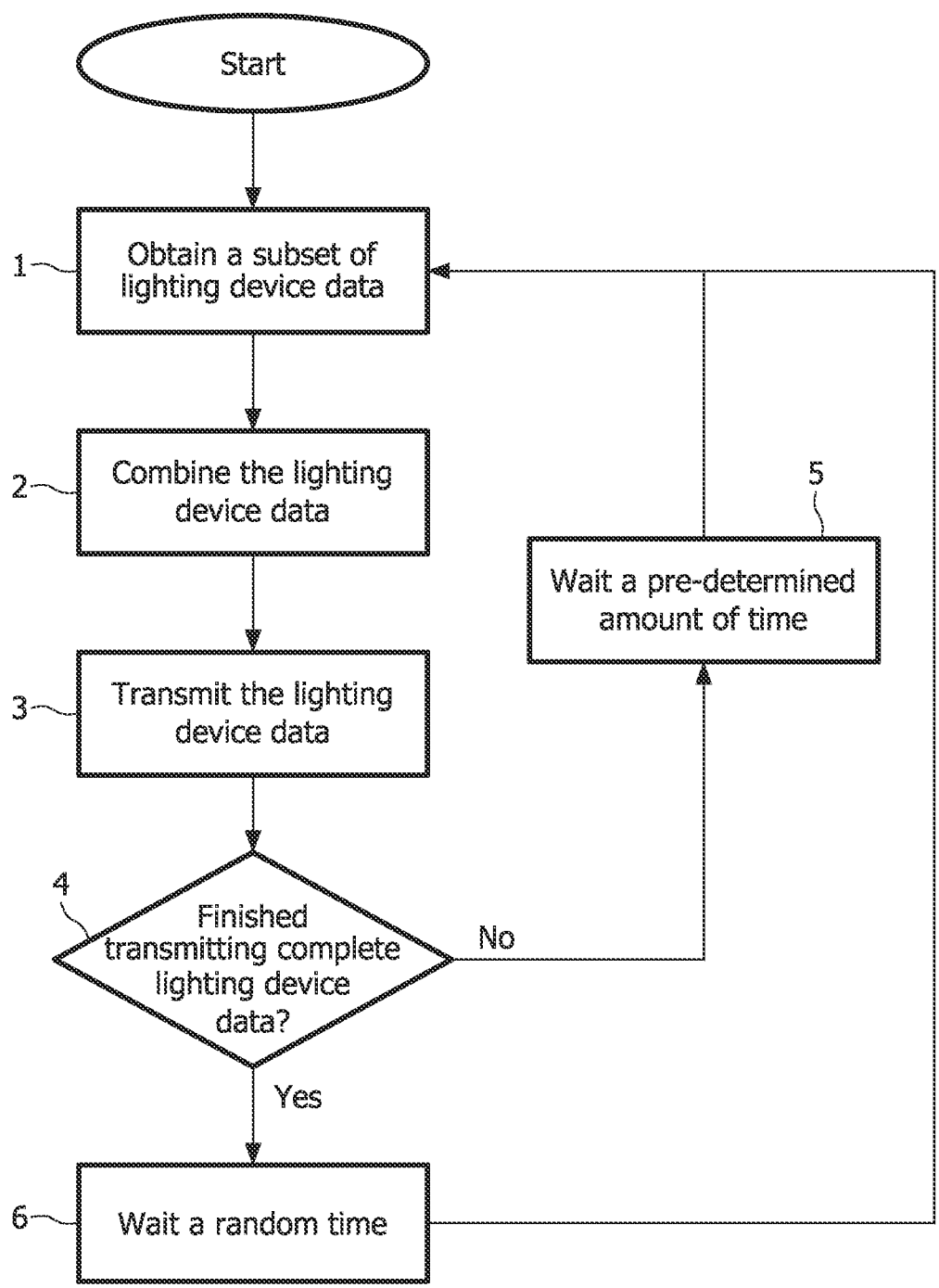
FIG. 1 shows a flow chart of a method according to an embodiment of the present invention.

FIG. 1 shows a flow chart of a method according to an embodiment of the present invention.

In an <obtain a subset of lighting device data> step 1, a subset of the lighting device data is retrieved from a data source. In one embodiment of the present invention, the subset of lighting device data is split up into subsets when stored in a data source. In one embodiment, the complete lighting device data is stored in the data source as one data item. The lighting device data is then split up in subsets where each subset is processed independently. The subsets of lighting device data can be of the same size, or varying sizes.

The lighting device data can comprise a header, a lighting device data portion, and a checksum.

In a situation that the light intensity of a lighting device is controlled by pulse width modulation, giving an average intensity over a cycle, splitting the lighting device data into subsets decreases the flickering of the light, especially when the lights are deeply dimmed.

In a <combine the lighting device data> step 2, lighting device data is combined with the pulse width modulated light, producing a combined light signal.

The above embodiment uses pulse width modulation for dimming the light or controlling the colour point of RGB-lighting devices. It is clear that the duty cycle can also be chosen at a fixed value, such that the light control is being performed by intensity modulation, and that the on-off switching is used primarily for the exchange of lighting device data. There can also be a combination of pulse width modulated and intensity modulated light.

In a <transmit the subset of lighting device data> step 3 the combined subset of lighting device data is transmitted. The subsets of lighting device data are transmitted as (modulated) light. In one embodiment, the transmitter is a solid state lighting device, and for example a light emitting diode (LED).

In a conditional <finished transmitting complete lighting device data> step 4, it is determined whether all subsets jointly corresponding to the complete lighting device data have been transmitted or not. If all subsets have been transmitted, the process continues to a <wait a random time> step 6. On the other hand, if all subsets have not been transmitted, the process continues to a <wait a pre-determined amount of time> step 5.

In the <wait a pre-determined amount of time> step 5, the process rests a pre-determined amount of waiting time until the next subset of lighting device data is transmitted according to the <obtain>, <combine>, <transmit> and <finished> steps mentioned above.

In the <wait a random time> step 6, the process rests a random or pseudo-random amount of time before the steps 1-6 are repeated. The random time interval can be zero. In one embodiment, the lighting device data is sent successively. This process typically ends when the environment in which the process is performed, e.g. a lighting device, is switched off.

Figure 2:
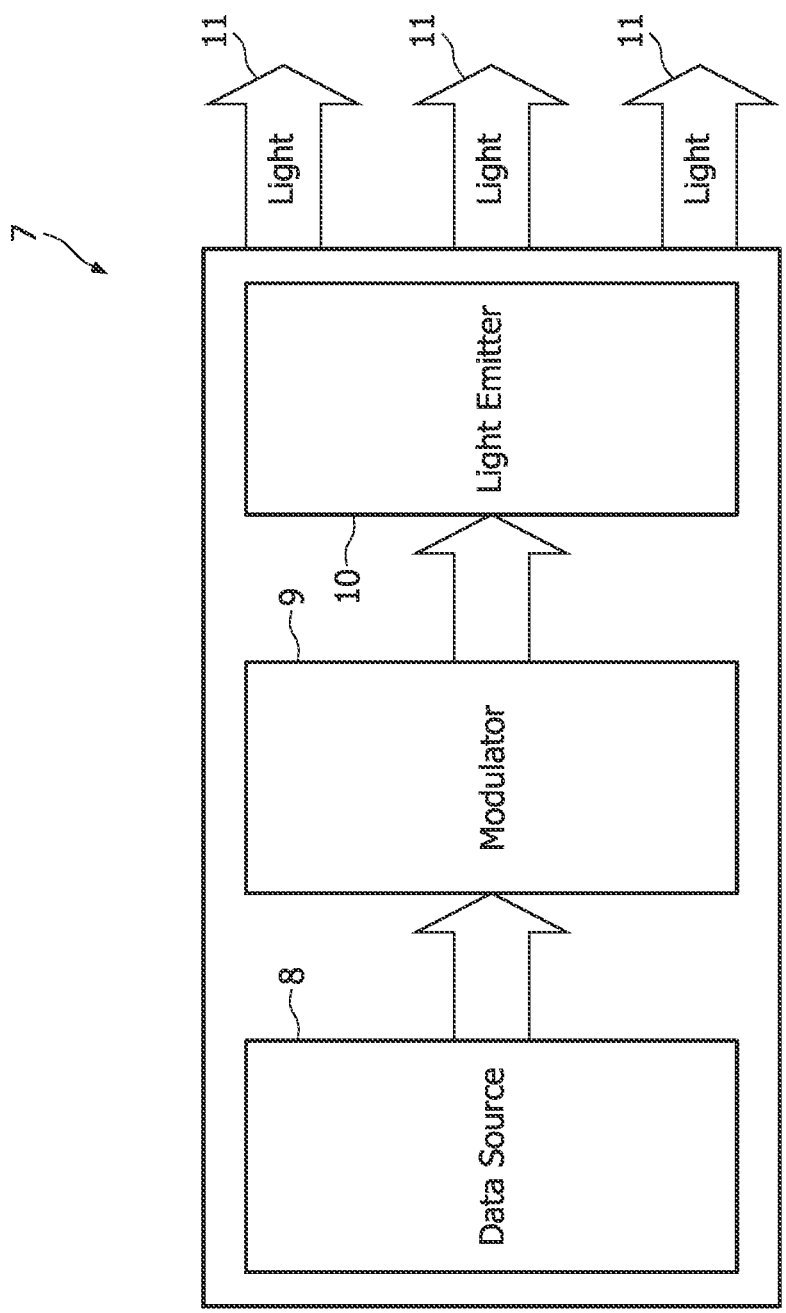
FIG. 2 shows a block diagram of a lighting device according to an embodiment of the present invention.

FIG. 2 shows a block diagram of a lighting device according to an embodiment of the present invention. The lighting device 7 comprises a data source 8, a modulator 9 and a light emitter 10. The data source 8 can comprise a static part and/or a dynamic part. The static part can for example contain a light source identifier code, whereby the light source can be identified. The dynamic part can include data such as lighting device status, e.g. the life length, colour point data, or temperature data of the light emitter 10. The light emitter 10 can be a solid state lighting device, e.g. a LED-device. The modulator 9 retrieves lighting device data from the data source 8, wherein the modulator modulates the light 11 emtted by the light emitter 10, which modulation can be pulse width modulation. The light 11 being emitted by the light emitter 10 comprises information with respect to the lighting device data. In one embodiment, the light 11 is in the ultraviolet, the visible, or the infrared part of the electromagnetic spectrum.

Figure 3:
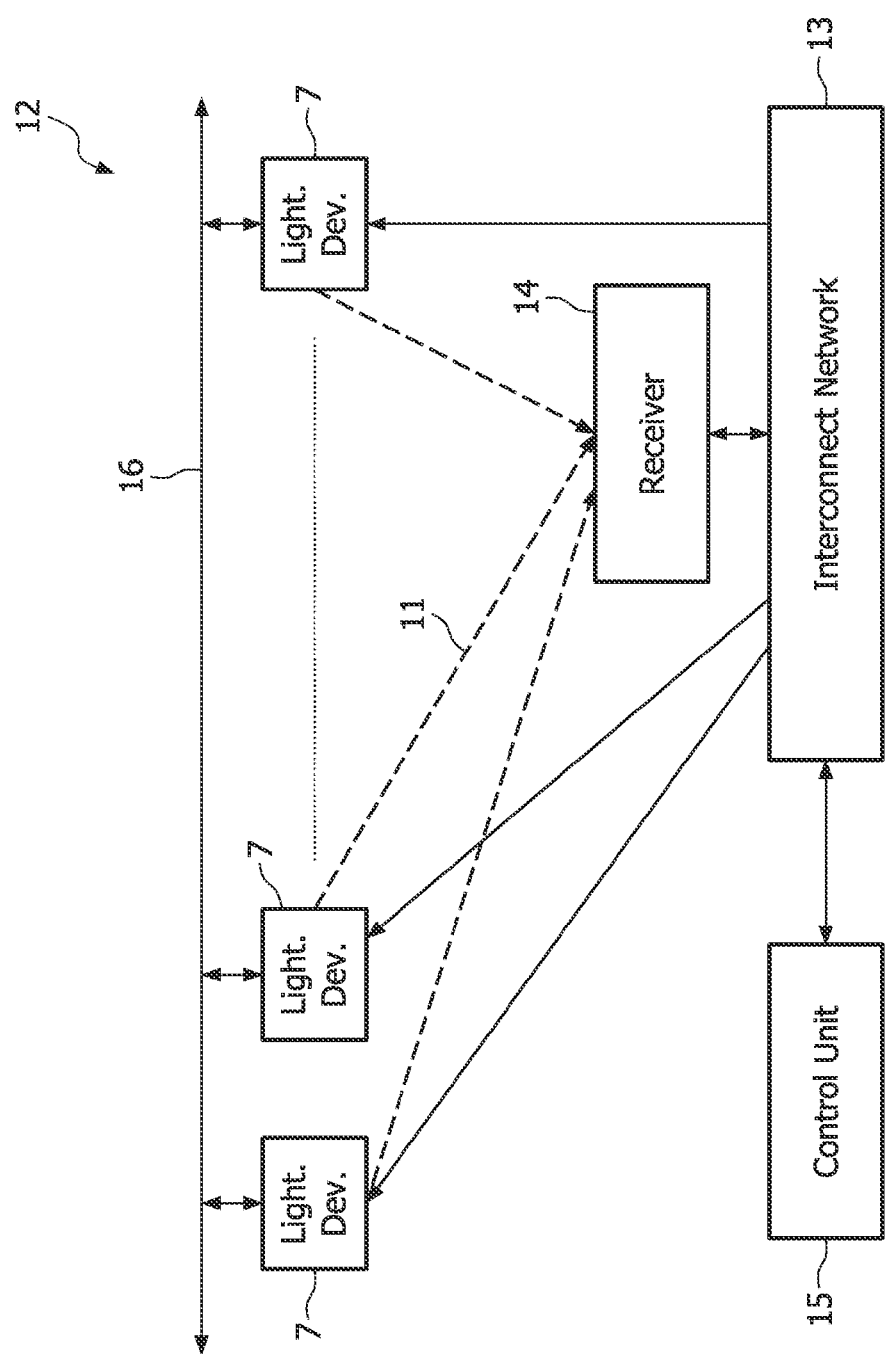
FIG. 3 shows a block diagram of a lighting system comprising the lighting device of FIG. 2.

FIG. 3 shows a block diagram of a lighting system 12 comprising lighting devices 7, an interconnect network 13, a receiver 14, a control unit 15 and at least one power unit 16. The lighting devices 7 emit light using power received from the at least one power unit 16. The at least one power unit 16 can for example be a mains source or a direct current power source. The light 11 emitted by the lighting devices 7 is modulated and contains lighting device data, the lighting device data being sent with random time between each new (complete set of) lighting device data. The light is detected by the receiver 14. The receiver 14 comprises a decoder to decode the light signals emitted by the lighting devices 7 to, with the help of the lighting device data, identify the corresponding lighting devices, i.e. the lighting device data comprises device identification codes. In one embodiment, the receiver 14 may further comprise a sensor for sensing the light intensity emitted by the lighting devices 7. The receiver 14 is further connected to the interconnect network 13. The control unit 15 is via the interconnect network 13 connected to the lighting devices 7 and the receiver 14. The control signals can be communicated via wireless communications, based on, for example, the Zigbee-standard, IEEE 802.15.4 or any IEEE 802.11-standard. According to this embodiment of the invention, there are receivers installed in the lighting devices 7. In this embodiment, clocks of the lighting devices do not need to be synchronized, i.e. the clocks can be asynchronous. The interconnect network can also be wired or a combination of a wired and a wireless network.

Figure 4:
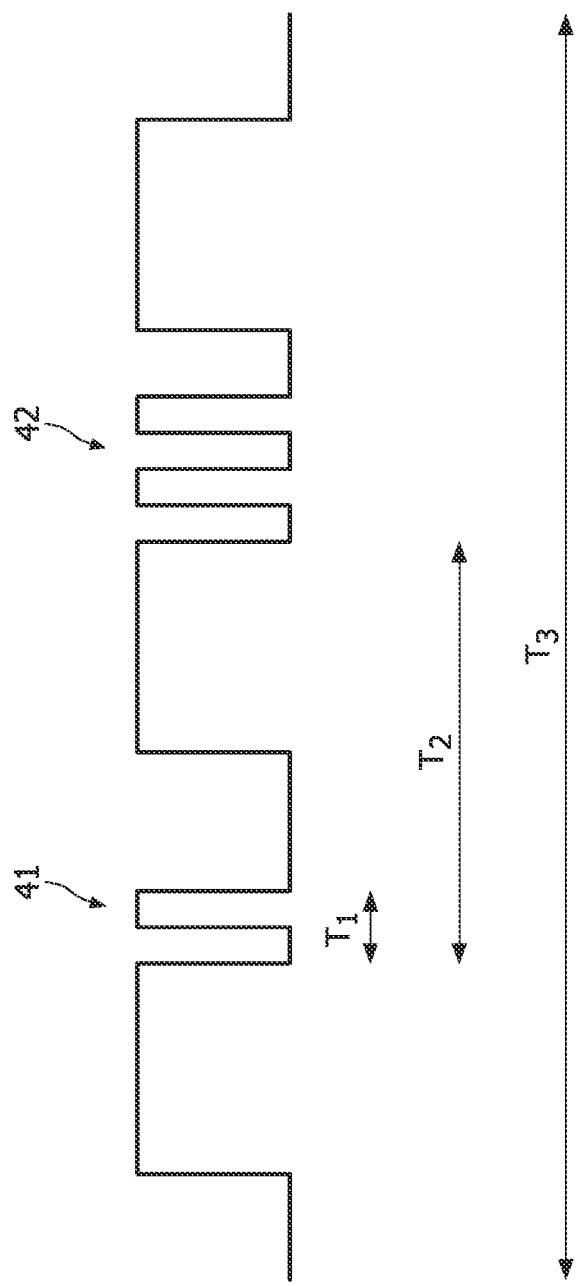
FIG. 4 shows a diagram illustrating the propagation in time of the illumination pattern that can be implemented in the lighting device of FIG. 2

FIG. 4 shows a diagram illustrating the propagation in time of the illumination pattern that can be implemented in the lighting device of FIG. 2. Each lighting device uses a system clock with cycle $T_1$. In one embodiment, the average duty cycle d of each lighting device can be in the range $\epsilon < d < 1-\epsilon$, $\epsilon$ being an arbitrarily small positive number larger than zero. Further, spectral components below 100 Hz are weak. During any $T_1$-interval, the illumination of the lighting device is either on or off. $T_1$ is assumed to be orders of magnitude shorter than the typical pulse width of a pulse width modulated light source. In one embodiment $T_1=1$ μs. In one embodiment there is multiplexing of the illumination pulses and lighting device data.

An interval of duration $T_2=N_1T_1$ is called a $T_2$-block, $N_1$ being an integer, and can equal the number of dimming steps. $N_2$ is the number of $T_2$-blocks making up one $T_3$-frame. During a $T_3$-frame a message of lighting device data of K bits is transmitted. The message can start at the same position in each $T_2$-block, wherein, in a frame, a lighting device chooses a random starting position for its message of lighting device data. For example, in one $T_2$-block a subset of lighting device data 41 is transmitted, and in the next $T_2$-block another subset of lighting device data 42 is transmitted.

In one embodiment, the transmission of the lighting device data can be asynchronous with respect to the $T_2$ block and $T_3$ frame.

To prevent interference from low-frequency components in the environmental illumination, the message can be carried as bi-phase modulation using two successive $T_1$-clock cycles per channel bit, i.e. "01" or "10".

In practice, the T1-timing differs for different lighting devices 7. In one embodiment, the receiver 14 oversamples the incoming light 11 and finds synchronisation for the detection of the signal payload.

Figure 5:
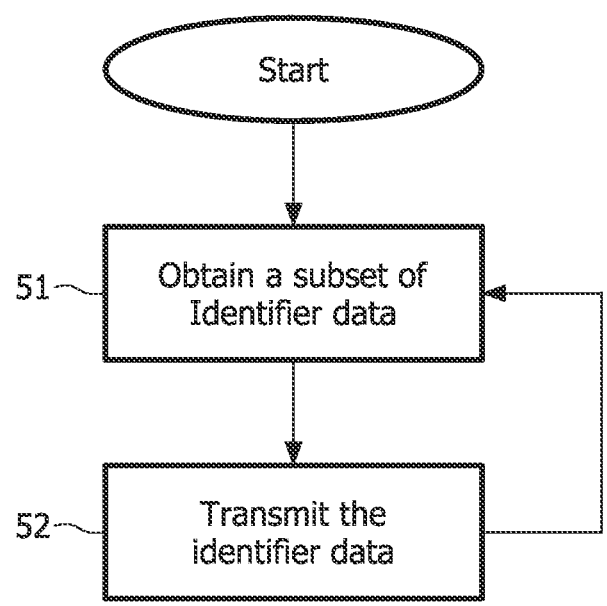
FIG. 5 shows a flow chart of a method according to an embodiment of the present invention.

FIG. 5 shows a flow chart of a method according to an embodiment of the present invention.

In an <obtain a subset of lighting device data> step 51, a subset of the lighting device data is retrieved from a data source 8. In one embodiment of the invention, the subset of lighting device data is split up into subsets when stored in a data source 8. In one embodiment, the complete lighting device data is stored in the data source as one data item. The lighting device data is then split up in subsets where each subset is processed independently. The subsets of lighting device data can be of the same size, or varying sizes.

In a situation that light intensity of a lighting device is controlled by pulse width modulation, giving an average intensity over a cycle, splitting the lighting device data into subsets decreases the flickering of the light, especially when the lights are deeply dimmed.

In a <transmit the lighting device data step> 52, lighting device data is transmitted with the pulse width modulated light, producing a combined light signal.

The invention claimed is:

1. A method for transmitting lighting device data, the method comprising the steps of:
    obtaining, in a lighting device, a plurality of subsets of lighting device data, the lighting device data containing information related to the complete lighting device data,
    transmitting, from the lighting device, embedded in illumination light, each of the plurality of subsets of lighting device data,
    repeating the above steps until all subsets jointly corresponding to the complete lighting device data have been transmitted;
    wherein the step of obtaining involves retrieving the subsets of lighting device data from a data source,
    receiving in a receiver the subsets of lighting device data jointly corresponding to the complete lighting device data, transmitted from at least one of the at least one lighting devices,
    processing the received subsets of lighting device data to obtain the complete lighting device data to receive information from the lighting devices;
    receiving in a control unit connected to the lighting device lighting device data from the receiver;
    using the lighting device data to locate the at least one lighting device, and
    controlling the light emitted from the at least one lighting device.

2. The method according to claim 1, wherein the step of obtaining involves splitting the lighting device data into subsets of equal size.

3. The method according to claim 1, further comprising the step, prior to the step of transmitting, of: combining the lighting device data with pulse width modulated light.

4. The method according to claim 1, wherein a time difference between subsequent occurrences of transmitting subsets of the same lighting device data equals a pre-determined value.

5. The method according to claim 1, wherein the steps of obtaining, transmitting and repeating are repeated for subsequent transmissions of the complete lighting device data.

6. The method according to claim 1, wherein a time difference between transmitting each complete lighting device data is determined by obtaining a random time.

7. The method according to claim 1, wherein the step of transmitting involves time multiplexing light and lighting device data.

8. A lighting device configured to transmit lighting device data, the lighting device comprising:
    a data source;
    a light emitter;
    wherein the light emitter is configured to obtain a plurality of subsets of lighting device data from the data source, the plurality of subsets jointly corresponding to the complete lighting device data, and
        the emitter further being configured to transmit, embedded in illumination light, each of the plurality of subsets of lighting device data,
    a receiver, configured to:
    receive the subsets of lighting device data jointly corresponding to the complete lighting device data, transmitted from at least one of the at least one lighting devices,
    processing the received subsets of lighting device data to obtain the complete lighting device data to receive information from at least one of the at least one lighting devices; and
    a control unit connected to the at least one lighting device configured to,
        receive lighting device data from the receiver,
        use the lighting device data to locate the at least one lighting device, and
        control the light emitted from the at least one lighting device.

9. The lighting device according to claim 8, wherein the light emitter further is configured to transmit each subset of the subsets of lighting device data, upon obtaining each subset from the data source.

10. The lighting device according to claim 8, wherein the light emitter comprises a solid state light source.

11. The lighting device according to claim 8, wherein the light emitter is configured to modulate the light using pulse width modulation, intensity modulation or a combination thereof.

12. The lighting system according to claim 8, wherein the lighting system comprises a plurality of lighting devices, and clocks of each of the plurality of lighting devices are asynchronous with respect to each other.

* * * * *